United States Patent [19]

Panza

[11] Patent Number: 4,553,631
[45] Date of Patent: Nov. 19, 1985

[54] SOUND ABSORPTION METHOD AND APPARATUS

[75] Inventor: Michael J. Panza, Erie, Pa.

[73] Assignee: United McGill Corporation, Groveport, Ohio

[21] Appl. No.: 496,066

[22] Filed: May 19, 1983

[51] Int. Cl.⁴ .............................................. E04B 1/82
[52] U.S. Cl. .................................... 181/291; 181/286; 181/296
[58] Field of Search ............... 181/284, 286, 290, 291, 181/294, 296

[56] References Cited

U.S. PATENT DOCUMENTS

| | | | |
|---|---|---|---|
| 2,413,568 | 12/1946 | Hurley | 181/291 |
| 3,151,700 | 10/1964 | Feid | 181/291 |
| 3,183,996 | 5/1965 | Capaul | 181/291 |
| 3,948,347 | 4/1976 | Rutledge | 181/291 |
| 4,111,081 | 9/1978 | Hilliard et al. | 181/290 |
| 4,194,329 | 3/1980 | Wendt | 181/291 X |
| 4,253,543 | 3/1981 | Johansson | 181/291 X |
| 4,301,890 | 11/1981 | Zalas | 181/286 |
| 4,347,912 | 9/1982 | Flocke et al. | 181/286 |

Primary Examiner—Benjamin R. Fuller
Attorney, Agent, or Firm—LeBlanc, Nolan, Shur & Nies

[57] ABSTRACT

A method of absorbing sound generated within a cleanroom environment and the sound-absorbing panel for carrying out that method, wherein said sound absorbing panel comprises a fibrous core material enclosed in a non-porous membrane, said membrane being attached to at least one of the extensive surfaces of said fiberglass core in a series of closed geometric figures. The membrane occupying the central portion of each of said geometric figures defines a diaphragm, the dimensions of the diaphragm being configured such that the lower order natural frequencies of vibration of each of the independent diaphragms correspond substantially to the frequency range of sound to be absorbed.

32 Claims, 6 Drawing Figures

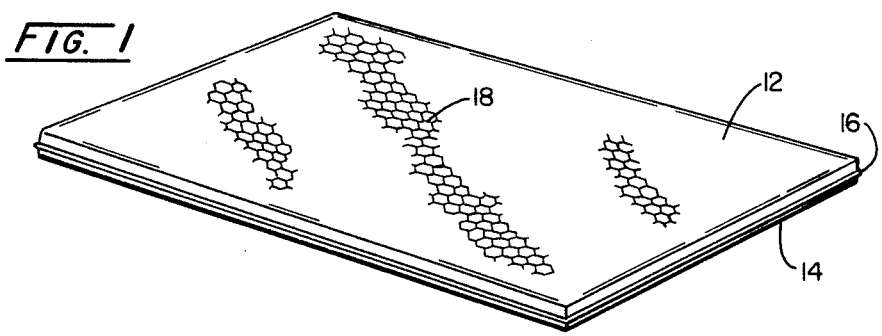
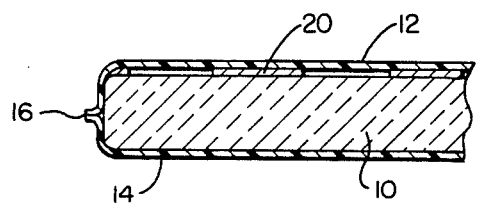
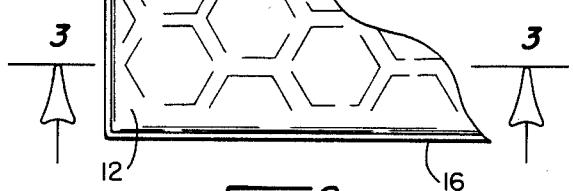
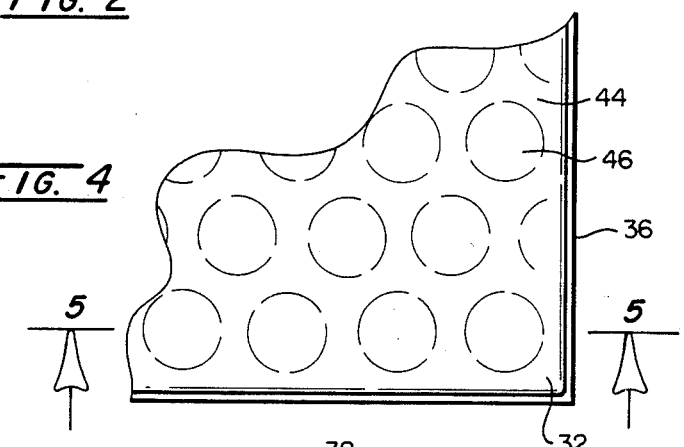
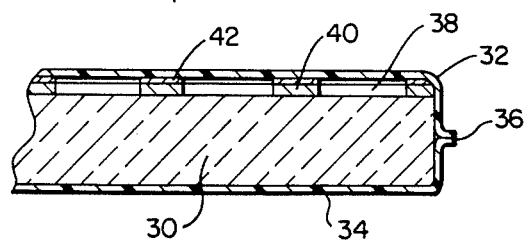

SOUND ABSORPTION METHOD AND APPARATUS

FIELD OF INVENTION

The invention relates to a method for absorbing sound in a clean-room environment and the apparatus, sound-absorbing panel, for carrying out that method; and more particularly relates to a sound-absorbing panel that is lightweight, washable and an effective sound absorber of acoustical energy in a selected range of frequencies.

BACKGROUND OF INVENTION

Noise generated in a clean-room environment, a room for use as for example in food processing, needs to be attenuated in order to allow for minimizing the background noise to at least within the limits specified by the Occupational Safety and Health Administration (OSHA). Numerous devices have been developed to effectively absorb sound, acoustical tile and other perforated sound absorbing material are examples. The problem of absorbing sound in a clean-room environment requires that the sound absorbing panel preferably have few areas in which organic growth can be supported and must be easily cleanable. While solutions to this problem have been found, U.S. Pat. No. 4,301,890 to Zalas is illustrative, such honeycomb diaphragm type panels are inherently expensive and still have the problem of puncture, since the membrane is simply stretched over the honeycomb area as a drumhead would be stretched over a drum body.

Heretofore, many different other methods have been utilized in an effort to make porous material suitable as sound absorber for clean-room, sanitary enrironments. These methods include inter alia the covering of traditional porous type acoustical ceiling tile with washable plastic surfaces. Of course these methods were unsuccessful since the acoustical attenuation features of the tile were seriously degraded by the coating process.

Therefore, there is a need for an inexpensive acoustical absorption panel suitable for clean-room environment in that it be washable and preferably hermetically sealed against the environment while still retaining full acoustical absorption characteristics within the specific acoustical frequency range to be absorbed.

SUMMARY OF THE INVENTION

I have developed a sound-absorbing panel for use in a clean-room environment which comprises a fiberglass core of specific thickness that is hermetically sealed within a continuous membrane, the membrane being preferably waterproof and substantially smooth to allow washing, the membrane being attached to at least one of the broad surfaces of the fiberglass core by means of an adhesive disposed in a continuous pattern of closed geometric figures, the places of attachment of the membrane to the fiberglass core defining the edges of said geometric figures. In this way, the membrane occupying the central portion of each of the geometric figures is free to act as a small independent diaphragm, the entire surface of the panel comprising a series of such independent diaphragms. Further, the size of the geometric figures is controlled in order that the resulting diaphragms will have lower order natural frequencies of vibration which correspond to the frequency range of the sound wave energy to be absorbed.

Another aspect of the present invention resides in the provision of a method for absorbing sound within a clean room environment comprising the steps of disposing on at least one interior surface of said clean room a sound absorbing panel, said panel having a fiberglass core of specific thickness, the core being hermetically sealed within a continuous membrane, the membrane being washable, non-porous, and substantially smooth to allow washability, the membrane being attached to at least one of the broad surfaces of the fiberglass core in a continuous pattern of closed, planar geometric figures, the places of attachment of the membrane to the fiberglass core defining the edges of said geometric figures. In this way, the membrane occupying the central portion of each of the geometric figures is free to act as a small, independent diaphragm, the entire surface of the panel comprising a series of such independent diaphragms. Further, the size of the geometric figures is controlled in order that the resulting diaphragms will have lower order natural frequencies of vibration which correspond to the frequency range on the sound wave energy to be absorbed. The sound absorbing panel is disposed in such a way on the interior surface of the room that the side having the continuous pattern of closed geometric figures faces the interior of the room.

An additional aspect of the present invention resides in modifying the sound-absorbing panel above described by the disposition of a perforated planar material between the membrane and the fiberglass core, the perforated material providing the site at which the membrane is attached, the perforated planar material in turn being attached preferably by means of an adhesive to the surface of the fiberglass core. The perforations in the perforated planar material correspond to the geometric figures sought to be produced and are specifically controlled in size for the above described reasons.

BRIEF DESCRIPTION OF THE DRAWINGS

FIG. 1 is a prospective view of a sound-absorbing panel according to the present invention.

FIG. 2 is an enlarged corner detail plan view of the sound-absorbing panel of FIG. 1.

FIG. 3 is an elevational sectional view taken along line 3—3 of FIG. 2.

FIG. 4 is an enlarged corner detail plan view of an alternative embodiment of an acoustical panel according to the present invention.

FIG. 5 is an elevational sectional view along line 5—5 of FIG. 4.

DETAILED DESCRIPTION OF THE INVENTION

Figure 6:
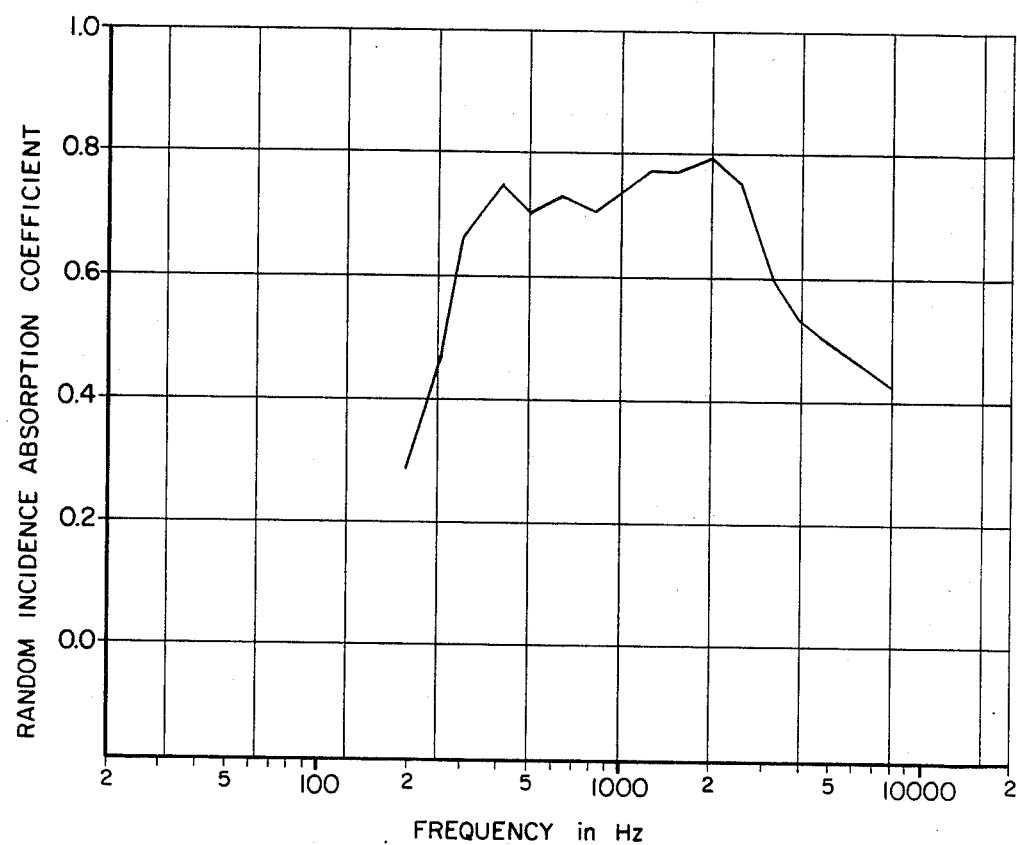
FIG. 6 is a graph, the Random Incidence Absorption Coefficient versus Sound Wave Frequency, for a sound-absorbing panel according to the present invention.

It was discovered by Zalas, U.S. Pat. No. 4,301,890, that a suitable sound-abosorbing panel could be fabricated by placing a membrane in contact with a honeycomb core material. The primary feature of that particular panel was that the sizing of the honeycomb compartments in conjunction with the material properties of the membrane, produced a flexible diaphragm at each honeycomb chamber in which the lower order natural frequencies of vibration of the diaphragm were substantially similar to both (1) the natural low order frequencies of vibration of the diaphragm in combination with the cavity in the honeycomb core and (2) the lower order standing wave frequency of sound in the cavity itself. In this way, the acoustical absorption properties of the panel were due to the hysteretic damping associated with the flexing of the membrane rather than simply the absorption of the sound in a fibrous material. Lower order frequencies of both the natural frequency and standing wave natural frequency type include the fundamental frequency and about the first ten harmonies of the fundamental frequency. Thus, the membrane, and more particularly, each of the individual diaphragms associated with the individual honeycomb chambers acted together as the primary sound-absorbing elements. The present invention provides a fibrous material core with a membrane stretched over that core, the membrane being attached to the core itself, or indirectly to the core via an intermediary perforated planar material, in such a way that only portions of the membrane are actually attached to the core, and those points of attachment define the edges of a continuous pattern of closed, planar geometric figures. The central portion of each of these geometric figures is not attached to the core or to any intermediate material and is free to act as an individual, independent diaphragm. The presence of the fibrous material, preferably a fiberglass core, immediately adjacent to each of the vibrating diaphragms does not interfere with the free vibration of the diaphragm, and therefore, it was discovered that by selectively attaching the membrane to the fiberglass core utilizing a purposefully sized geometric pattern, that properties similar to those derived from a membrane/honeycomb sound absorbing panel could be achieved in a much more inexpensive manner.

The sizing of the geometric figures, be they hexagons, circles, or other similar closed geometric figures, may be sized in order to "tune" the panel to selectively absorb sound waves in the range of acoustical or sound wave energy that is sought to be absorbed. The sizing of these geometric figures requires that the sound band to be absorbed or attenuated be known and also the fundamental properties of the membrane material must be well known. Additionally, it has been found that the thickness of the fiberglass core material plays a significant part in the overall effectiveness of the acoustical panel. In this way, the low order natural frequencies of the diaphragms in the membrane and the low order natural frequencies of the membrane/material thickness and also the low order standing wave natural frequencies of sound in that material thickness must be substantially similar, and lie within the sound wave energy range to be absorbed. The equations for computing these various frequencies are similar to those previously described by Zalas. The membrane natural frequency is given by:

$$f_m = \beta(0.46a^{-2}t)(E/\rho(1-\sigma^2))^{\frac{1}{2}} \text{ Hz.} \quad (1)$$

The combination of membrane/material thickness natural frequency is given by:

$$f_c = 60(Md)^{-\frac{1}{2}} \text{ Hz.} \quad (2)$$

The material thickness standing wave natural frequency is given by:

$$f_s \approx 340/3d \quad (3)$$

Where:
$f_m$ = the membrane natural frequency in Hertz;
t = membrane thickness in meters;
$\beta$ = 1.02, 1.47, 1.88, 2.01, ... factors as determined for a circular plate of fixed perimeter
a = membrane radius in meters (the radius of a circle having an area equal to the cross-sectional area of a diaphragm within the membrane);
E = elastic modulus of the membrane in Newtons per square meter;
$\rho$ = membrane density in kilograms per cubic meter;
$\sigma$ = Poisson's ratio of membrane;
$f_c$ = combination membrane/material thickness natural frequency in Hertz;
M = equivalent surface mass of membrane in kilograms per square meter;

$$M = M_1 M_2/(M_1 + M_2) \quad (4)$$

$M_1, M_2$ = surface masses, respectively, of the two membranes in kilograms per square meter;
d = material thickness in meters (fiberglass core thickness); and
$f_s$ = frequency between first quarter wave and first half-wave standing wave resonance of sound in the material thickness in Hertz.

The figures are best understood by reference to FIGS. 1, 2, and 3 which depict a perspective view of a sound-absorbing panel in accordance with the present invention details and sections of the same. A fibrous material 10, preferably fiberglass with a density of 3.5 to 4 lbs. per cubic foot (56 to 64 kilograms per cubic meter), is enclosed by the combination of membrane 12 on its upper extensive surface and a similar membrane 14 along its lower extensive surface, membranes 12 and 14 being sealed together by a seal 16 which is preferably hermetic sufficient to prevent the intrusion of air, water or foreign material into the fiberglass core area. It will be apprciated that membranes 12 and 14 may be a single, continuous membrane that is disposed to fully enclose the core. Enclose means to fully surround the core in a three-dimensional way. The membrane material is preferably 1.5 to 2.0 mil (0.38 to 0.51 centimeter) thick polyurethane as for example, the material marketed by Norwood Industries under the name Korel (a registered trademark of Norwood Industries). The specified polyurethane material has an elastic modulus of $1 \times 10^9$ Newtons per square meter, a density of $1.24 \times 10^3$ kilograms per cubic meter, and a Poisson's ratio of 0.4. Therefore, to estimate the size of the closed geometric figure to produce a diaphragm capable of absorbing wide sound wave energy range centering on 1000 Hz. to about 2000 Hz., the usual sound range audible to the human ear and often caused by equipment operating in food processing area, that diameter should be approximately ½ inch (12.7 mm.). The membrane 12 on the upper extensive surface of the fiberglass core is attached at the edges of the geometric figures to be formed preferably by means of an adhesive. Reference to FIG. 2 will show the attachment areas 20 and the open diaphragm areas 22. An adhesive may be applied either to the fiberglass surface as by means of a stencil or other such means or to the reverse side of the membrane 12 again in the appropriate pattern allowing for the closed diaphragms to be appropriately formed. FIG. 2 indicates the geometric shape as being closed independent hexagon shapes, while reference to FIG. 4 shows a circular pattern in which closed, independent circular shaped diaphragms 46 are formed while the intermediate area 44 is the attachment area.

Reference to FIGS. 4 and 5 together will describe an alternative embodiment of the sound-absorbing panel. A fiberglass core 30 is sealed within a membrane 32 across the upper extensive surface of said fiberglass core and a membrane 34 over the lower extensive surface of the fiberglass core, the two membranes 38 and 34 being sealed together at seal 36 to prevent the intrusion of air, water and dirt. A perforated planar material 38 has been inserted between membrane 32 and fiberglass core 30. The perforated planar material has been perforated in this case with circles the size of the desired diaphragms 46. The remaining material in the perforated planar material provides the surface areas for gluing at 44. An adhesive 40 has been applied to the upper surface of the perforated material 38 that it may adhere to the membrane 32 producing the diaphragms 46 while a similar adhesive 42 has been applied to the opposite face of perforated material 38 so that the perforated material may adhere to the upper extensive surface of the fiberglass core 30.

It will be appreciated that the membrane may be attached to both the upper extensive surface and to the lower extensive surface of the fiberglass core either by directly applying the membrane to the fiberglass core material as described in FIGS. 1–3 or by utilization of an intermediate perforated material as illustrated by FIGS. 4 and 5. The utilization of both sides of the fiberglass core material would allow for acoustical interception on either face of the sound absorbing panel. The presence of the membrane along the lower extensive surface, whether it be adhered in a geometric pattern, or loosely applied and maintained in position by means of the hermetic seal, provides a backup mass to the panel which is necessary in order to allow the fiberglass core to participate in the sound absorption by the panel. The primary sound absorbing element remains the diaphragms on the upper extensive surface of the panel.

Turning now to FIG. 6 which is a graph of the Random Incidence Absorption Coefficient, a quantification well known in the art, versus Sound Wave Frequency for a panel utilizing a continuous pattern of closed geometric figure diaphragms according to the present invention wherein the average diameter of the diaphragms measured either as the diaphragm of a circle or as the circular equivalent of a polygonal figure is approximately ½ inch (12.7 mm.). It can be seen that the graph centers on approximately 1000 Hz. to 2000 Hz., retaining relatively high absorption over a wide range of sound wave energy frequencies, (250 Hz. to 8000 Hz.). This confirms the results of the previous calculations.

It will be appreciated that the fibrous core material of such an acoustical panel need not be fiberglass but may be of other fibrous materials of various densities. Fiberglass was chosen to illustrate the various embodiments of this invention since it is readily available and relatively light weight for easy handleability. It will also be appreciated that various other membrane materials may be utilized provided they have the features of washability, nonporosity and being relatively smooth so as not to hide organic growth in a clean room environment. Additionally, it will be appreciated that other diaphragm diameters may be utilized depending upon the target range of sound energy sought to be absorbed, or attenuated.

It will be appreciated that numerous changes and modifications may be made in the above described embodiments of the invention without departing from the scope thereof. Accordingly, the foregoing description is to be construed in an illustrative and not in a limitative sense, the scope of the invention being defined solely by the appended claims.

I claim:

1. Sound-absorbing panel for use in clean-room environment comprising:

a fibrous core having a first extensive surface, a second extensive surface parallel to and spaced apart from said first extensive surface and a thickness being the perpendicular distance between said extensive surfaces;

a non-porous membrane being disposed to enclose said fibrous core, said membrane being attached to at least one of said extensive surfaces in a continuous pattern of closed geometric figures, the places of attachment defining the edges of said geometric figures, the membrane occupying the central portion of each of said geometric figures defining a diaphragm, the dimensions of said diaphragm being configured such that the low order natural frequencies of vibration of said diaphragm substantially corresponds to the sound wave frequency range to be absorbed.

2. The apparatus according to claim 1 wherein said membrane is waterproof.

3. The apparatus according to claim 1 wherein said membrane is a substantially smooth material.

4. The apparatus according to claim 1 wherein said fibrous core has a thickness in which the low order standing wave natural frequencies, and the low order natural frequencies in combination with said diaphragm is substantially similar to the diaphragm low order natural frequencies.

5. Apparatus according to claim 4 wherein said fibrous core has a thickness of approximately 1 inch.

6. The apparatus according to claim 1 wherein said fibrous core is hermetically sealed by said membrane.

7. The apparatus according to claim 1 wherein said fibrous core is fiberglass.

8. The apparatus according to claim 1 wherein said membrane is attached to said fibrous core by an adhesive.

9. The apparatus according to claim 1 wherein said membrane is attached to said second extensive surface of said fibrous core in a continuous pattern of closed geometric figures, the places of attachment defining the edges of said geometric figures, the membrane occupying the central portion of each of said geometric figures defining a diaphragm, the dimensions of said diaphragm being configured such that the low order natural frequencies of vibration of said diaphragm substantially corresponds to the sound wave frequency range to be absorbed.

10. The apparatus according to claim 1 wherein said diaphragms have the shape of hexagons.

11. The apparatus according to claim 1 wherein said diaphragms have the shape of circles.

12. The apparatus according to claim 1 wherein the dimensions of said geometric figures correspond to an equivalent circle having a ½ inch diameter.

13. The apparatus according to claim 10 wherein the distance between the opposite sides of one of said hexagons is approximately ½ inch.

14. The apparatus according to claim 1 wherein the center frequency of said frequency range to be absorbed is in the range of about 1000 Hz. to about 2000 z.

15. The apparatus according to claim 1 wherein said places of attachment of said membrane to said first extensive surface of said fibrous core further comprise an intermediate material bearing an adhesive on the faces of said intermediate material adjacent to and in contact with said membrane and said fibrous core.

16. The apparatus according to claim 9 wherein said places of attachment of said membrane to said second extensive surface of said fibrous core further comprise an intermediate material bearing an adhesive on the faces of said intermediate material adjacent to and in contact with said membrane and said fibrous core.

17. A method for absorbing sound generated within a clean-room environment comprising the steps of:
disposing on at least one interior surface of the room a sound-absorbing panel having:
a fibrous core with a first extensive surface, a second extensive surface parallel to and spaced apart from said first extensive surface and a thickness being the perpendicular distance between said extensive surfaces;
a non-porous membrane enclosing said fibrous core, said membrane being attached to at least said first extensive surface in a continuous pattern of closed geometric figures, the places of attachment defining the edges of said geometric figure, the membrane occupying the central portion of each of said geometric figures defining a diaphragm, the dimensions of said diaphragm being configured such that the low order natural frequencies of vibration of said diaphragm substantially corresponds to the sound wave frequency range to be absorbed;
said sound-absorbing panel having said first extensive surface disposed to face the interior of the room.

18. The method according to claim 17 wherein said membrane is waterproof.

19. The method according to claim 17 wherein said membrane is a substantially smooth material.

20. The method according to claim 17 wherein said fibrous core has a thickness in which the lower order standing wave natural frequencies, and the lower order natural frequencies in combination with said diaphragm is substantially similar to the diaphragm lower order natural frequencies.

21. The method according to claim 20 wherein said fibreous core has a thickness of approximately 1 inch.

22. The method according to claim 17 wherein said fibrous core is sealed by said membrane.

23. The method according to claim 17 wherein said fibrous core is fiberglass.

24. The method according to claim 17 wherein said membrane is attached to said fibrous core by an adhesive.

25. The method according to claim 17 wherein said membrane is attached to said second extensive surface of said fibrous core in a continuous pattern of closed geometric figures, the places of attachment defining the edges of said geometric figures, the membrane occupying the central portion of each of said geometric figures defining a diaphragm, the dimensions of said diaphragm being configured such that the lower order natural frequencies of vibration of said diaphragm substantially corresponds to the sound wave frequency range to be absorbed.

26. The method according to claim 17 wherein said diaphragms have the shape of hexagons.

27. The method according to claim 17 wherein said diaphragms have the shape of circles.

28. The method according to claim 17 wherein the dimensions of said geometric figures corresponds to an equivalent circle having a $\frac{1}{2}$ inch diameter.

29. The method according to claim 26 wherein the distance between the opposite sides of one of said hexagons is approximately $\frac{1}{2}$ inch.

30. The method according to claim 17 wherein the center frequency of said frequency range to be absorbed is in the range of about 1000 Hz. to about 2000 Hz.

31. The method according to claim 17 wherein said places of attachment of said membrane to said first extensive surface of said fibrous core further comprise an intermediate material bearing an adhesive on the faces of said intermediate material adjacent to and in contact with said membrane and said fibrous core.

32. The method according to claim 17 wherein said places of attachment of said membrane to said second extensive surface of said fibrous core further comprise an intermediate material bearing an adhesive on the faces of said intermediate material adjacent to and in contact with said membrane and said fibrous core.

* * * * *

UNITED STATES PATENT AND TRADEMARK OFFICE
CERTIFICATE OF CORRECTION

PATENT NO. : 4,553,631

DATED : November 19, 1985

INVENTOR(S) : Michael J. Panza

It is certified that error appears in the above-identified patent and that said Letters Patent is hereby corrected as shown below:

Column 2, line 58, change "abosorbing" to --absorbing--.

Column 6, last line, "$2000_z$" should be --$2000H_z$--.

Signed and Sealed this

*Eighteenth* Day of *February 1986*

[SEAL]

*Attest:*

DONALD J. QUIGG

*Attesting Officer*     *Commissioner of Patents and Trademarks*